Feb. 15, 1927. 1,617,817
P. McNULTY
WATER FIRE BOX
Filed Aug. 26, 1925    2 Sheets-Sheet 1
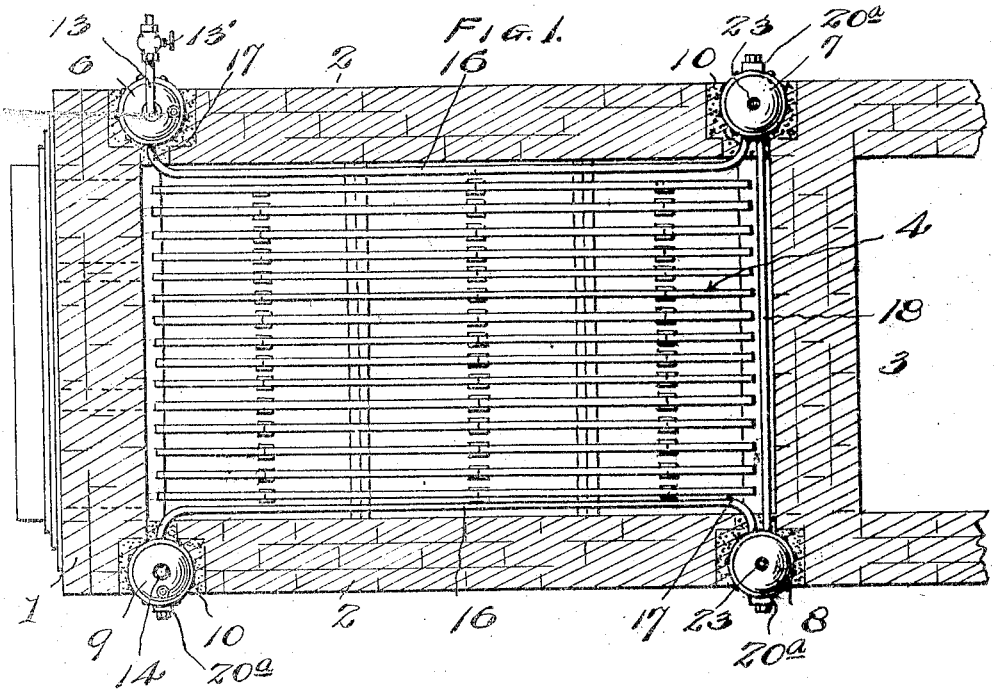
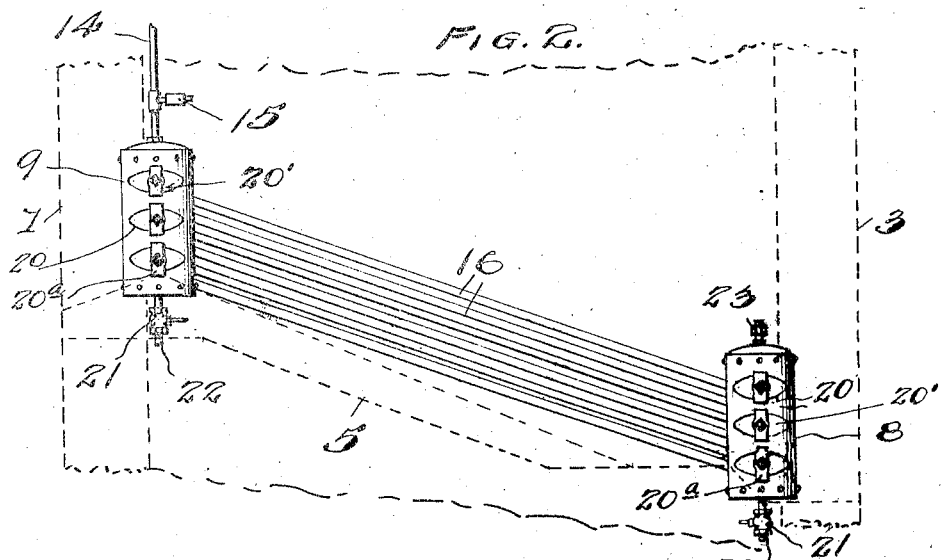
Inventor
PATRICK McNULTY
Thomas R. Harney
Attorney Feb. 15, 1927.

P. McNULTY 1,617,817

WATER FIRE BOX

Filed Aug. 26. 1925   2 Sheets-Sheet 2

Inventor
PATRICK McNULTY.
Thomas R. Harvey
Attorney

Patented Feb. 15, 1927.

1,617,817

UNITED STATES PATENT OFFICE.

PATRICK McNULTY, OF NORWOOD, MASSACHUSETTS.

WATER FIRE BOX.

Application filed August 26, 1925. Serial No. 52,649.

The present invention relates to an improved water fire box particularly adapted for use in boiler furnaces for the protection of the furnace walls. As is well known various means are now employed to form a water wall between the furnace walls and the fire in the furnace for the protection of the furnace walls and for the purpose of preheating the water supplied to the boiler drum. The means now in use with which I am familiar fail in the efficient accomplishment of their purposes for the reasons that they are not durable, cannot be repaired with facility, and frequently cause long outages of the furnace while being repaired. By the utilization of my improved water fire-box a water wall is provided which has an efficient absorption surface to receive radiant heat of the furnace, and to cool the adjoining walls of the furnace. By thus cooling and lowering the temperature of the furnace walls the formation of clinkers along the walls is prevented and the durability of the furnace walls is enhanced, and yet the cooling effect of the water circulating in the water fire box does not extend into the furnace a sufficient distance to interfere with the efficiency of combustion in the furnace.

By the combination and arrangement of parts of my improved water fire-box the parts may with facility be assembled, the equipment readily cleaned, repaired, parts replaced, and the whole maintained in the best possible condition for efficient and economical use.

The invention consists in certain novel combinations and arrangements of parts as will hereinafter be more fully set forth and claimed.

In the accompanying drawings I have illustrated one complete example of the physical embodiment of my invention wherein the parts are combined and arranged in accordance with the principles of my invention, but it will be understood that the water fire-box may be adapted for use with various other types of boiler furnace and changes and alternations made therein as required, within the scope of my claim without departing from the spirit of my invention.

Figure 1 is a horizontal sectional view of a portion of a conventional boiler furnace showing the installation of the water fire box of my invention.

Figure 2 is a side view of the water firebox showing by dotted lines the relation of the stoker and furnace walls.

Figure 3:
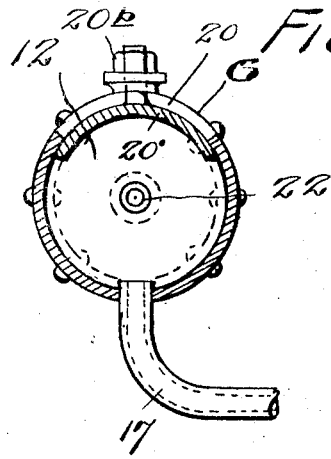
Figure 3 is a horizontal, transverse sectional view of the intake drum and connections forming part of the fire-box.
Figure 4:
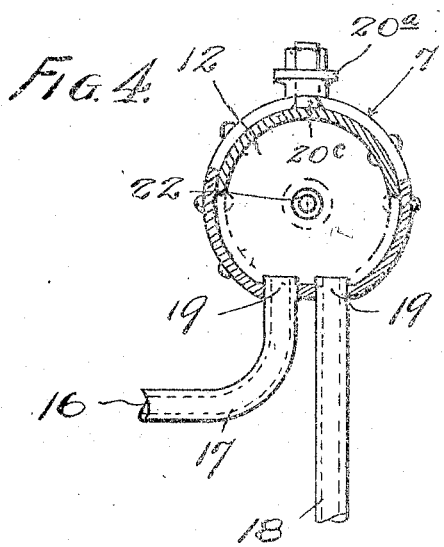
Figure 4 is a similar view of one of the intermediate drums.
Figure 5:
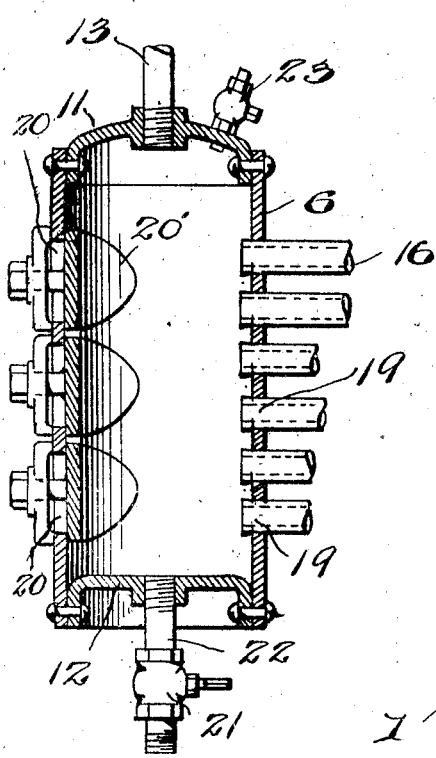
Figure 5 is a vertical sectional view of the outlet drum with connections to the boiler drum.

In order that the general relation of parts may readily be understood I have shown a conventional type of boiler furnace with front wall 1, side walls 2, back wall 3, and grate 4, and in Figure 2 a stoker 5 is indicated by dotted lines, it being understood that the water wall or water fire-box is located within the walls of the furnace and extends from the grate 4 up to the upper line of the fire bed.

In carrying out my invention I utilize four drums indicated as 6 for the intake of water, 7 and 8 as intermediate drums, and 9 as an outlet drum.

Figure 6:
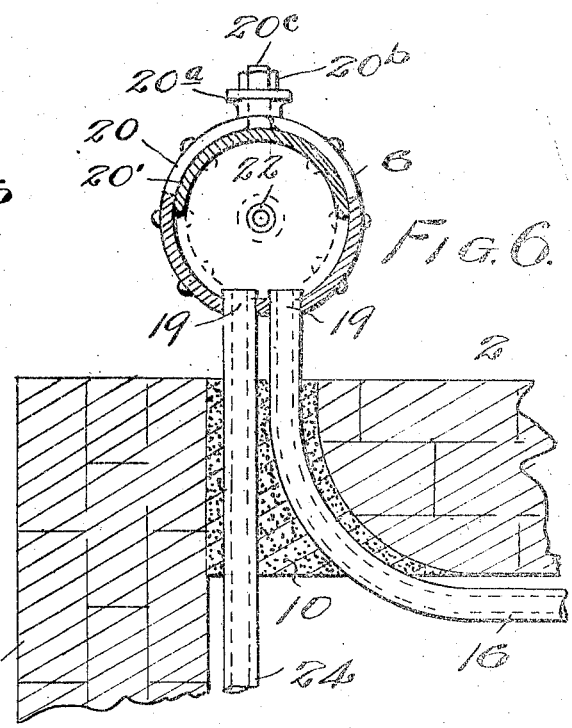
Figure 6 is a sectional view of a modified form of the invention including an intake drum located outside the furnace wall and provided with a water tube along the front wall of the furnace.

These drums which are spaced in rectangular formation with relation to the furnace walls are preferably located within the walls, which may be of refractory brick, and refractory filling material as indicated at 10 in Figures 1 and 6 is used to fill in the opening provided in the brick walls.

The drums are preferably of cylindrical formation, say nine inches in diameter, and provided with flanged, riveted ends as the upper head 11 and lower head 12. The intake or inlet drum is connected with a suitable source of supply by pipe 13 in its upper head and a control valve 13' is indicated for controlling the supply of water thereto. The outlet drum 9 is connected directly to the supply drum of the boiler (not shown) by outlet pipe 14, and this pipe is also provided with a relief valve 15 for excess pressure in the cooling system.

The vertically arranged drums are connected by water tubes located in vertical series adjacent to the furnace walls, which series comprise a suitable number of pipes or tubes spaced the required distance apart. The water tubes are disposed either horizontally, or at an inclination, depending upon the type of the furnace with which they are employed. In Figure 2 it will be seen that the side tubes 16 are disposed at an incline conforming to the grate and stoker of the furnace. At their ends the side tubes are fashioned with curved bends 17, and the series of end tubes 18 extend in a straight line between the intermediate drums 7 and 8. The side tubes as well as the end tubes are joined to their respective drums by means of expanded joints indicated at 19, and the joints of the side tubes and end tubes in the intermediate drums are preferably staggered, to prevent weakening of the drum walls.

In the drum walls directly opposite the expanded joints of the tubes, hand holes are provided as at 20, to permit entrance of necessary tools for cleaning and repairing the fire box.

As seen in the several figures of the drawings the hand holes are located in the opposite wall of the drum from that which supports the ends of the tubes in line with the ends of a pair of tubes or to give access to the ends of two pairs of staggered tubes, for cleaning, repairing, etc. The hand holes are located in the drums at the exterior of the furnace walls in order that they are readily accessible from the exterior of the furnace without necessity for use of the interior of the furnace for repairs. The hand holes are closed by means of interior covers or cover plates 20' and each cover is secured to the drum by means of a yoke 20ª and nut 20ᵇ on the stud bolt 20ᶜ of the cover plate. Access may readily be had to the interior of the drum by first removing the yoke and then withdrawing the cover plate. Variations may be made in the number of the tubes employed as well as in the number of hand holes, and the latter are of sufficient size for the accomplishment of their purpose.

The tubes may be alined flush with the interior surfaces of the furnace walls, and the bends 17 in the side tubes, not only permit facility in cleaning or repairing the side tubes, but also provide for expansion and contraction of the tubes under varying degrees of heat.

Each drum is provided with a blow off cock 21 and pipe 22, the latter entering the bottom portion of the drum, by means of which the fire box may be drained and cleaned, and a vent 23 is provided in the head 11 for escape of air as the water enters.

In Figure 6 one of a series of tubes 24 is indicated as used at the interior side of the front wall 1 of the furnace, and the drums, as indicated by the position of the intake drum 6, are located exterior of the furnace walls. Such changes and alterations are contemplated in the installation of the firebox and are considered within the scope of my claim.

It will be apparent that with the valve 13' open water is supplied to the intake drum 6 and flows through the side tubes to the intermediate drum 7, end tubes 18 and intermediate drum 8, and thence through the side tubes 16 to the outlet drum 9 and through said drum and outlet pipe 14 to the supply drum of the boiler, thus forming a water wall around the fire, or around the major portion of the fire, as desired for the performance of the functions previously set forth.

Having thus fully described my invention, what I claim as new and desire to secure by Letters Patent is—

In combination with furnace walls, a water fire box comprising a series of drums in rectangular formation and each provided with an air vent and drain pipe, water-walls connecting said drums comprising spaced side tubes having bent ends extending outwardly and projecting into the furnace walls, and expanded joints in adjoining drums, spaced end tubes having expanded joints in adjoining drums, covered hand holes in said drums complementary to said expanded joints, an inlet pipe to one drum, and an outlet pipe from another drum.

In testimony whereof I have affixed my signature.

PATRICK McNULTY.